Feb. 17, 1942. L. P. CLARK, JR Re. 22,028

ELECTRICAL PLUG DEVICE

Original Filed April 13, 1932 3 Sheets-Sheet 1

Inventor

Lancaster P. Clark, Jr.

By Harris Mattson

Attorney

Feb. 17, 1942. L. P. CLARK, JR Re. 22,028

ELECTRICAL PLUG DEVICE

Original Filed April 13, 1932 3 Sheets-Sheet 2

Inventor

Lancaster P. Clark, Jr.

By

Attorney

Feb. 17, 1942. L. P. CLARK, JR Re. 22,028

ELECTRICAL PLUG DEVICE

Original Filed April 13, 1932 3 Sheets-Sheet 3

Inventor
Lancaster P. Clark Jr.
By
Harris Mattern
Attorney

Reissued Feb. 17, 1942

Re. 22,028

UNITED STATES PATENT OFFICE 22,028

ELECTRICAL PLUG DEVICE

Lancaster P. Clark, Jr., Bridgeport, Conn., assignor to Electric Plug, Incorporated, Bridgeport, Conn., a corporation of Connecticut Original No. 1,979,958, dated November 6, 1934, Serial No. 604,947, April 13, 1932. Application for reissue May 3, 1941, Serial No. 391,812

3 Claims. (Cl. 173—334)

The present invention relates to improvements in electrical plug devices, and has for an object to provide in such a device a plug and contact unit which may be formed of one piece of metal, will be inexpensive and reliable in construction, and will provide a positive, firm, and reliable contact. A further object is to provide a construction in which the plug contact units may be assembled with great facility and which when in use will be securely held in the insulating housing against displacement and distortion through the engagement therewith of the plug portions of a similar plug device. Another object is to provide a housing which may be conveniently molded, and which will have the desirable characteristics of light weight, compactness and strength, and which will at the same time provide ample room for the convenient attachment of wires.

A further object is to provide an electrical plug device in which the plug and contact units each consist of a strip of metal bent upon itself to form a double thickness plug portion, the two sides of the strip being provided at the base of the plug portion with outwardly bowed portions from which are extended single thickness contact portions, these latter converging into contact with each other when not engaged by a plug portion of an adjacent plug device, and adapted to be spread through such engagement into substantially parallel or surface conforming relation, whereby they engage the sides of the inserted plug portion with surface contact.

With the above and other objects in view embodiments of the invention are shown in the accompanying drawings, and these embodiments will be hereinafter more fully described with reference thereto, and the invention will be finally pointed out in the claims.

In the drawings.

Similar reference characters indicate corresponding parts throughout the several figures of the drawings.

Figure 1:
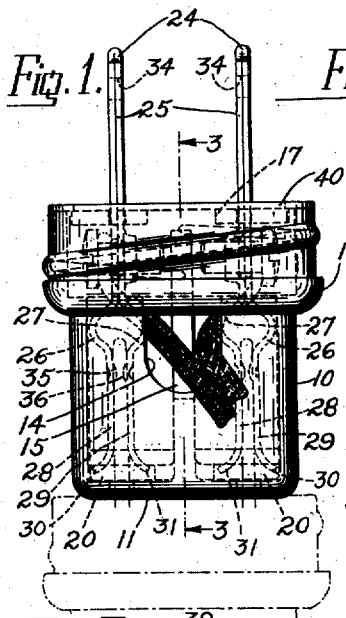
Fig. 1 is a side elevation of an electrical plug device, embodying the invention, and showing in dot-and-dash lines another plug device inserted therein.
Figure 3:
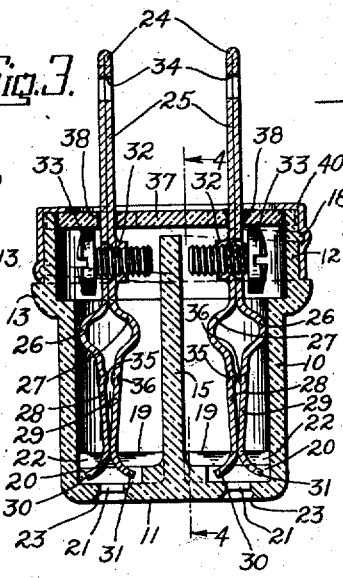
Fig. 3 is a vertical sectional view, taken along the line 3—3 of Fig. 1.
Figure 4:
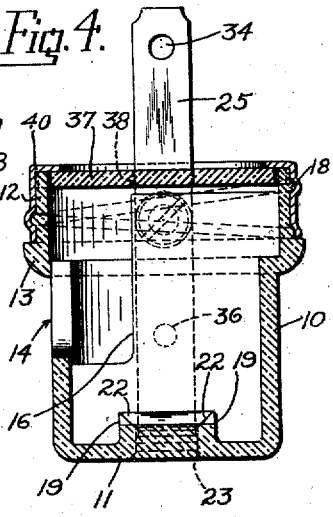
Fig. 4 is a vertical sectional view, taken along the line 4—4 of Fig. 3.
Figure 2:
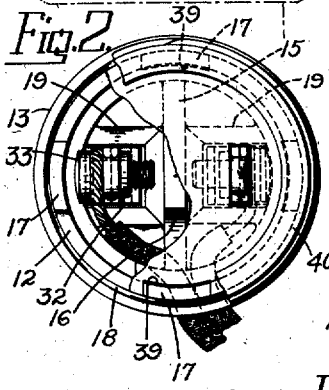
Fig. 2 is a plan view of the device.
Figure 6:
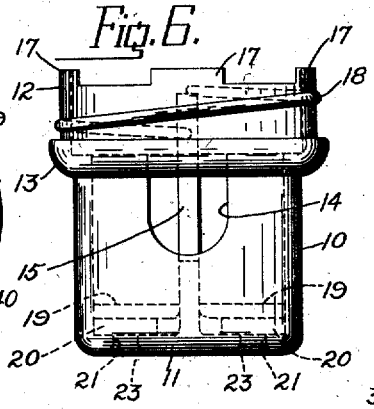
Fig. 6 is a side elevation of the insulating housing employed.
Figure 8:
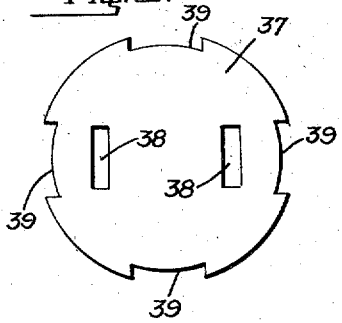
Fig. 8 is a plan view of the closure plate employed.
Figure 5:
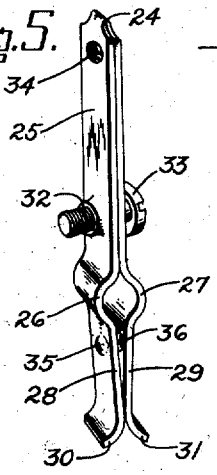
Fig. 5 is a perspective view of the plug and resilient contact unit, according to the invention.
Figure 7:
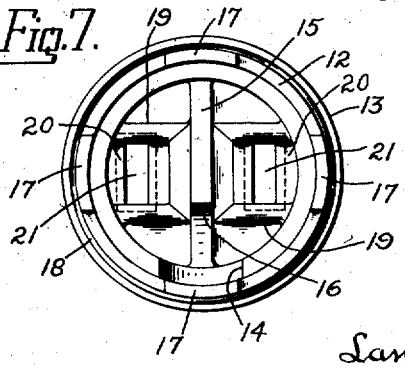
Fig. 7 is a plan view of the insulation housing.
Figure 9:
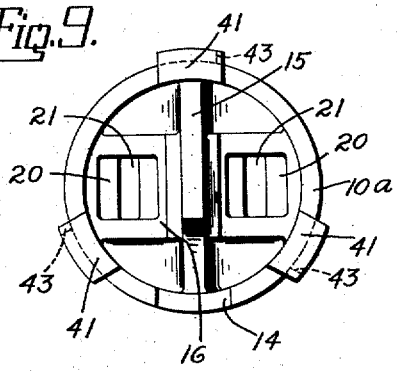
Fig. 9 is a plan view of an insulating housing, employed in a modified form of the invention.
Figure 10:
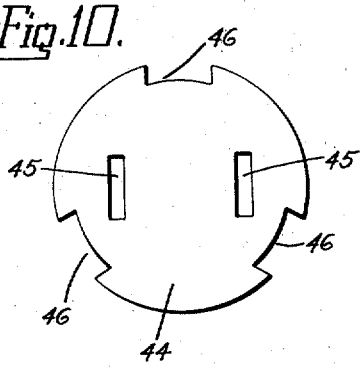
Fig. 10 is a plan view of the closure plate employed with the housing as shown in Fig. 11.
Figure 11:
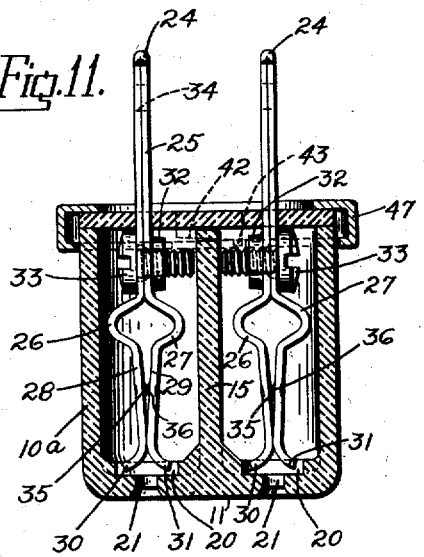
Fig. 11 is a vertical sectional view of the modified form of the invention employing the housing and cover plate shown in Figs. 9 and 10.
Figure 13:
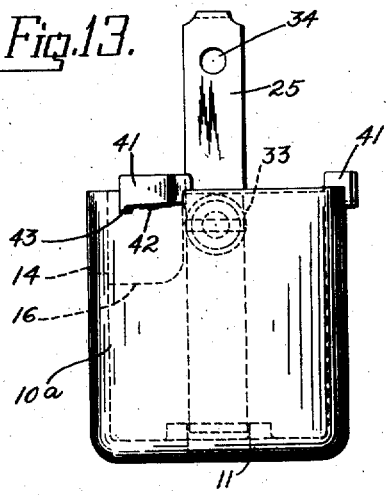
Fig. 13 is a side elevation turned 90° from the side, as shown in Fig. 9, and with the closure plate removed.
Figure 12:
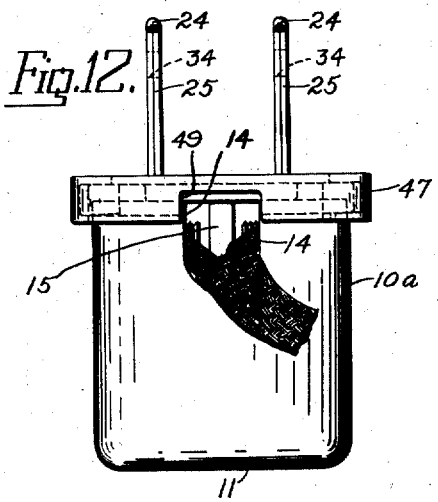
Fig. 12 is a side elevation thereof.
Figure 14:
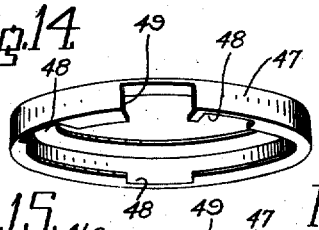
Fig. 14 is a perspective view of the clamping ring employed in the modification shown in Figs. 9 to 13.

Referring to the drawings, the insulating housing or shell of the plug device, according to the embodiment of the invention illustrated in Figs. 1 to 8, is preferably molded from hard rubber, Bakelite, or other suitable material, and is of generally cylindrical hollow form, comprising a cylindrical side wall 10 and a base 11, the side wall having at its upper end an outwardly offset cylindrical portion 12, connected to the main cylindrical portion 10 by an annular rib 13, which also serves the triple purpose of providing a ledge for protecting the edge of the clamping ring, a continuous annular reinforcement, and a finger engaging portion for enabling the plug to be conveniently inserted or removed from a socket element. A lead wire opening 14 is provided in the side wall 10 extending downwardly from the upper edge, its upper end portion being spanned by the rib 13. It will be observed that the inner wall of the portion 12 is substantially flush with the outer surface of the portion 10, so that in molding the housing the opening 14 may be formed by a part on the mold core from which the housing may be stripped by a straight pull.

A vertical partition wall 15 is provided within the housing shell in the central plane intersecting the center of the lead wire opening, a lead wire cut out 16 being provided therein adjacent the opening 14. The edge of this cutout is designed so that it may also be formed by a portion of the mold core and will not interfere with the stripping of the housing shell from the core by a straight pull. The upper edge of the portion 12 is provided with a series of projections 17 for interlockingly engaging cutouts in the closure plate, as will hereinafter more fully appear. Upon the outer side of said portion 12 there is formed a single narrow, slightly projecting, large pitch screw thread 18. The arrangement of this thread in relation to the rest of the housing structure is such that it will not interfere with the stripping of the housing shell from the mold by a straight pull, the material being sufficiently elastic at the moment of stripping to permit this.

In the base 11 there is provided in the compartment at each side of the partition wall 15 a relatively thick platform portion 19, having a rectangular recess 20 therein and in the base of which is formed a plug receiving slot 21. The side walls of the recesses 20 are beveled at the upper portions, as at 22, for guiding the contact portions of the plug and contacting units therein, and the exterior edges of the slots 21 are beveled, as at 23, to guide the entrance of plugs therein.

A pair of plug and contact devices or units are secured in the insulating housing, and each is preferably formed by bending a strip of suitable metal upon itself, as at 24, to form a double thickness substantially rigid plugging portion 25, the two legs being bowed outwardly at the base of the plugging portion, as at 26 and 27, and extended in converging relation to form contact portions 28 and 29. The bowed portions 26 and 27 provide spring ends for the contact portions 28 and 29, so that they may be sprung apart into parallel plug contacting relation, without bending them between their ends, the spring action taking place in the bowed portions. The ends of the contact portions 28 and 29 are flared outwardly, as at 30 and 31, to provide plug guiding surfaces. The plugging portion 25 is provided adjacent the bowed portions 26 and 27 with an extended threaded hole 32 in which a binding post screw 33 is screwed. In forming the extended threaded hole the side leg at the head side of the screw is punched with a hole slightly larger than the screw and the other side leg is pierced and extended and the opening therein threaded.

The plugging portion 25 is provided near its upper end with a hole 34, and the contact portions 28 and 29 are provided with inwardly pressed bosses 35 and 36 respectively, which are adapted to snap into the hole 34 of a similar plug unit when the latter is plugged into the device, as shown in Fig. 1.

The cover plate 37 is provided with a pair of slots 38—38 in line with the slots 21—21 in the base, and in its periphery there is provided a series of cutouts 39 adapted to interlockingly engage the projections 17 at the upper edge of the housing shell. The cover plate is clamped down upon the housing shell by means of a threaded and flanged clamping ring 40, engaged with the thread 18 of the portion 12.

In assembling the plug and contact units the plugging portions 25 are inserted through the slots 38—38 of the cover plate in which they preferably engage with a snug fit, and the contact portions are then placed in the housing at the respective sides of the partition wall 15, the flared ends 30 and 31 being engaged in the rectangular pockets 20—20. The cover plate is thereupon clamped in place by the clamping ring 40. In practice the lead wires will be attached to the units before they are inserted in the housing. It will be observed that the pockets 20—20 position the units vertically while at the same time permitting the contact portions 28—29 to be separated upon insertion of a plug between them, as shown in dot-and-dash lines in Fig. 1.

In Figs. 9 to 14 I have illustrated a modification, similar in general arrangement to the form illustrated in Figs. 1 to 8, but in which the housing shell 10a is provided at its upper end with a series of lugs 41 projecting upwardly and also projecting laterally and extending for a short distance downwardly upon the outer surface. The under side 42 is slightly inclined to form the projection into a wedge, and at the lower end of the incline there is provided a stop lug 43.

The closure plate 44 is provided with slots 45—45 in alignment with the slots 21—21 of the base, and at its periphery is provided with cut outs 46 adapted to interlockingly engage the lugs 41 of the housing shell. A flanged clamping ring 47 having an outer vertical side and upper and lower laterally disposed flanges is provided in its lower flange with a series of cutouts 48 adapted to be engaged over the lugs 41 and upon turning of the ring to have one end brought into wedging engagement with the inclined under surface 42 of the lugs to thus clamp the closure plate in place, the stop lug 43 limiting the turning of the ring. A cut out 49 in the side and bottom flange registers with the lead wire opening 14 in the clamped position of the ring.

Figure 15:
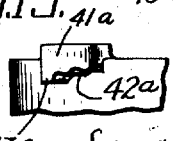
Fig. 15 is an elevation of a portion of an insulation housing similar to that shown in Fig. 13, but with a modified form of clamping lug.
Figure 16:
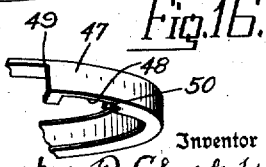
Fig. 16 is a fragmentary perspective view of a modified form of clamping ring for cooperation with the lug illustrated in Fig. 15.
Figure 17:
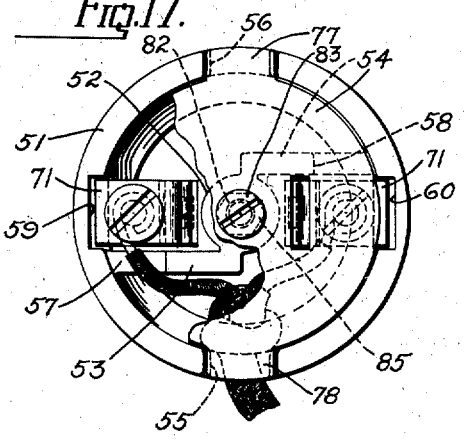
Fig. 17 is a top plan view, partially broken away, of an electrical plug device according to a further modified form of the invention.
Figure 20:
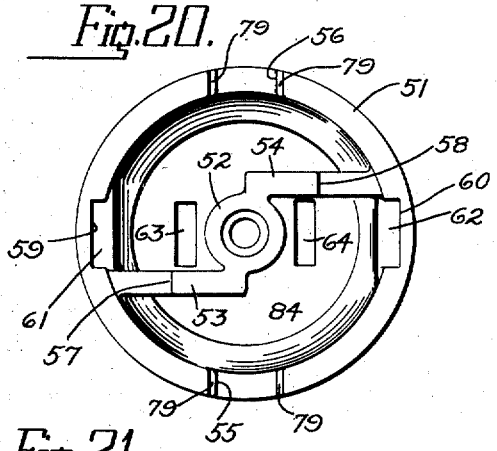
Fig. 20 is a top plan view of the insulating housing employed.
Figure 18:
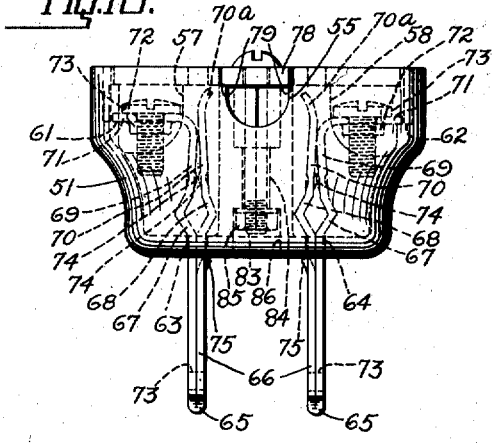
Fig. 18 is a side elevation thereof.

In the modification illustrated in Figs. 15 and 16 the under surface of the lug 41a is corrugated, and the lower flange of the ring 47 is provided with a pressed in boss 50 adjacent the end of the cut out 48 for yieldingly engaging the corrugations, the stop lug 43a limiting the turning of the ring.

In Figs. 17 to 23 I have illustrated a further modification of the invention comprising an insulating cup-shaped housing shell 51, the side wall of which is cylindrical at its upper portion and contracted toward the base so that it may be conveniently gripped by the fingers. A post 52 is integrally formed centrally of the base, its upper end being slightly below the upper edge of the side wall, and reinforcing and guide walls 53 and 54 extend in opposite directions from opposed sides of the post to the side wall. Diametrically opposed cut outs 55 and 56 for lead wires are provided in the upper end of the side wall, and cutouts 57 and 58 are provided in the upper ends of the walls 53 and 54 for extending lead wires from the binding posts to said openings 55 and 56.

The side wall is provided adjacent the walls 53 and 54 with vertically disposed channels 59 and 60, extending downwardly from the top edge and terminating in laterally disposed shoulders or ledges 61 and 62 respectively.

Within the base and at opposed sides of the post 52 there are provided slots 63 and 64, disposed at right angles to the walls 53 and 54.

A pair of plug devices or units are secured in the housing, and each is preferably formed by bending a strip of suitable metal upon itself, as at 65, to form a double thickness substantially rigid plugging portion 66, the two legs being bowed outwardly at the base of the plugging portion, as at 67 and 68, to form a shoulder, and extended in slightly converging relation, as at 69 and 70, to form contact portions. The bowed portions 67 and 68 provide spring ends for the contact portions 69 and 70, so that they may be sprung apart without bending them between their ends, the spring action taking place in the bowed portions. The contact portion 69 is bent laterally, as at 71, and is provided with an extended threaded hole 72 to receive a binding post screw 73, and the other contact portion 70 is flared at its ends, as at 70a to provide a plug guiding surface.

Figure 21:
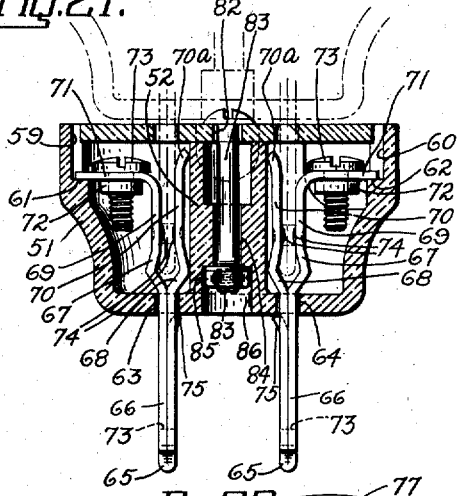
Fig. 21 is a sectional view, taken along the line 21—21 of Fig. 19, and showing in dot-and-dash lines another plug device inserted therein.
Figure 19:
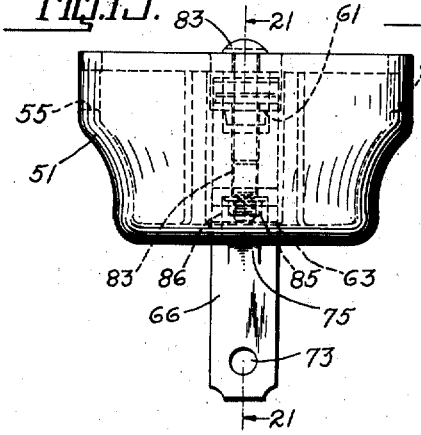
Fig. 19 is a side elevation, turned 90° from the side as shown in Fig. 18.
Figure 22:
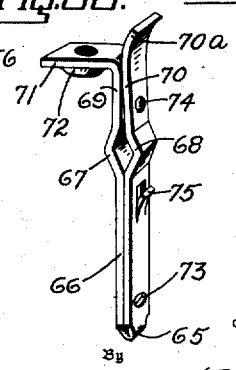
Fig. 22 is a perspective view of the plug and resilient contact unit employed in the modification illustrated in Figs. 17 to 21.
Figure 23:
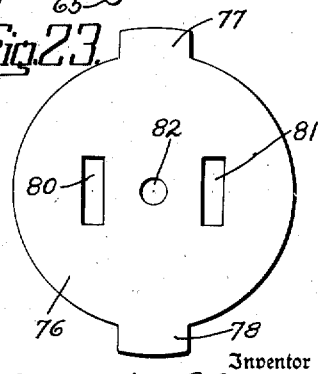
Fig. 23 is a plan view of the closure plate employed.

The plugging portion 66 is provided near its upper end with a hole 73, and the contact portions 69 and 70 are provided with inwardly pressed bosses 74—74 respectively, which are adapted to snap into the hole 73 of a similar plug unit when the latter is plugged into the device, as shown in dot-and-dash lines in Fig. 21. The guide walls 53 and 54, which extend to the closure plate 76 adjacent the slots 80 and 81 each provides a guide to insure properly aligned insertion of the plugging portions.

In assembling the units the plugging portions 66 are projected through the slots 63 and 64 in the base of the housing, the shouldered portions 67—68 abutting the base at the inner side, and a depressible finger 75 formed on one of the legs of the plugging portion engaging at the outer side to thus retain the unit against displacement and accidental removal. It will be understood that in inserting the unit the finger 75 will be depressed as it passes through the slot and will snap into locking relation when the unit is fully inserted. The laterally bent portions 71 are engaged in the channels 59 and 60 upon the ledges 61 and 62 in such relation as to position the unit, while at the same time permitting a slight outward and inward sliding movement of said portions 71, as plugging ends are engaged with and disengaged from the contact portions 69 and 70.

A cover plate 76 is seated within the open end of the housing upon the upper end of the post 52 and is provided with projecting lips 77 and 78 which engage the lead wire openings, the lead wire openings preferably having ledges 79—79 upon which the lips rest. Plug receiving slots 80 and 81 are provided in the plate in line with the slots 63 and 64 of the base, and a center hole 82 is provided between them in which the securing bolt 83 is engaged, this bolt being extended through a passage 84 in the post 52, and having a nut 85 upon its threaded end disposed in a countersunk recess 86 in the lower end of the post.

I have illustrated and described preferred and satisfactory embodiments of the invention, but it will be obvious that changes may be made therein, within the spirit and scope thereof, as defined in the appended claims.

Having thus described my invention what I claim and desire to secure by Letters Patent is:

1. In an electrical plug device, a housing shell of insulating material, having spaced end walls, one of said end walls having a pair of transversely aligned plug receiving openings and the other of said end walls having a pair of transversely aligned plug positioning slots having their long sides parallel to each other, said housing shell having pockets disposed between said end walls and said plug receiving openings and said plug positioning slots being in axial alignment with each other along said pockets, and a pair of metallic plug and resilient contact units respectively carried in said pockets in said housing, each comprising a single strip of metal bent upon itself for a portion of its length to form a double thickness plug portion adapted to project from said housing respectively through one of said slots, the two sides of said strip being bent outwardly adjacent the base of said double thickness plug portion symmetrically at each side of the central plane of said portion to form outwardly movable springy portions and being extended from said springy portions to form a pair of single thickness contact portions, said contact portions being disposed respectively in relation to one of said plug receiving openings to receive a plug between them and normally converging toward each other from said springy portions and each being adapted through the engagement of the plug portion of an adjacent plug device with its converging contact portions to be spread at its two sides into parallel relation in surface contact with said inserted plug portion.

2. In an electrical plug device, a housing shell of insulating material, having spaced end walls, one of said end walls having a pair of transversely aligned plug receiving openings and the other of said end walls having a pair of transversely aligned plug positioning slots having their long sides parallel to each other, said housing shell having pockets disposed between said end walls and said plug receiving openings and said plug positioning slots being in axial alignment with each other along said pockets, and a pair of metallic plug and resilient contact units respectively carried in said pockets in said housing, each comprising a single strip of metal bent upon itself for a portion of its length to form a double thickness plug portion and a pair of single thickness extensions integral with said double thickness plug portion and forming opposed contact portions adapted to receive a plug inserted respectively in one of said plug receiving openings between them, the two sides of said strip being bowed outwardly between said double thickness plug portion and said single thickness contact portions to form springy portions, said contact portions normally converging toward each other from said bowed springly portions, said double thickness plug portions being engaged and projected through said plug positioning slots and are each adapted through the engagement of the plug portion of an adjacent plug device with its converging contact portions to be spread at its two sides into parallel relation in surface contact with said inserted plug portion.

3. In an electrical plug device, a cup shaped housing of molded insulating material having a side wall including an outwardly offset circumferentially continuous collar portion adjacent its upper end, an annular shoulder upon the inner surface of said side wall formed by the offset of said collar portion there being a lead wire opening in the side wall below said collar portion, said opening having non-converging sides extending to said shoulder and being vertically clear and entirely inwardly disposed with respect to the inner surface of said collar portion, and metallic contact units within said housing.

LANCASTER P. CLARK, JR.